April 18, 1933.  W. B. SIMPSON  1,904,989
SPREADER
Filed Sept. 26, 1931
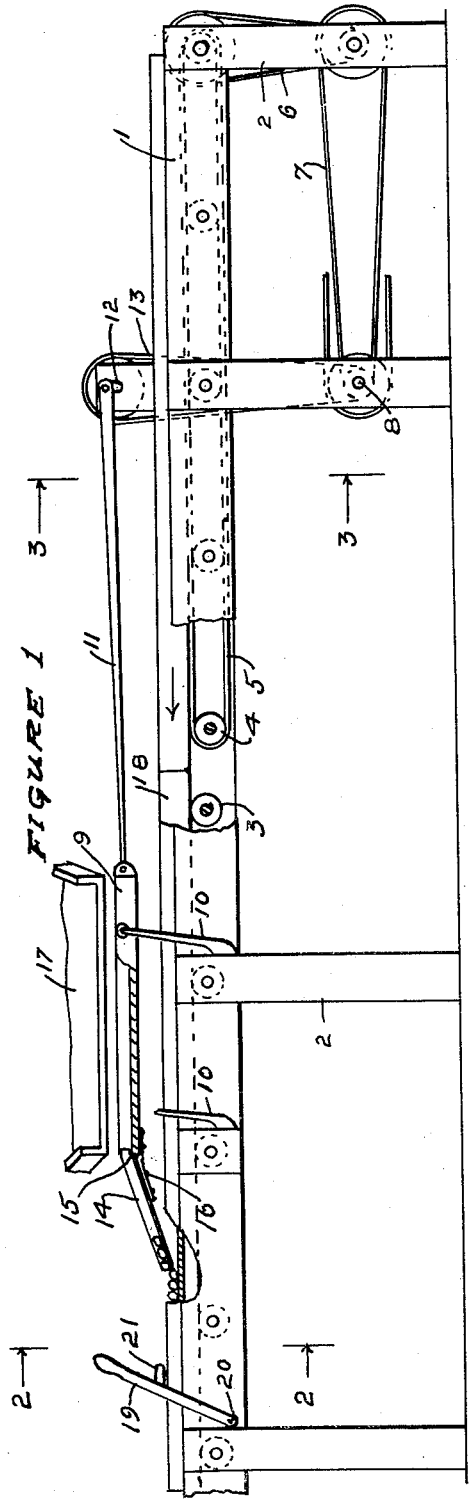
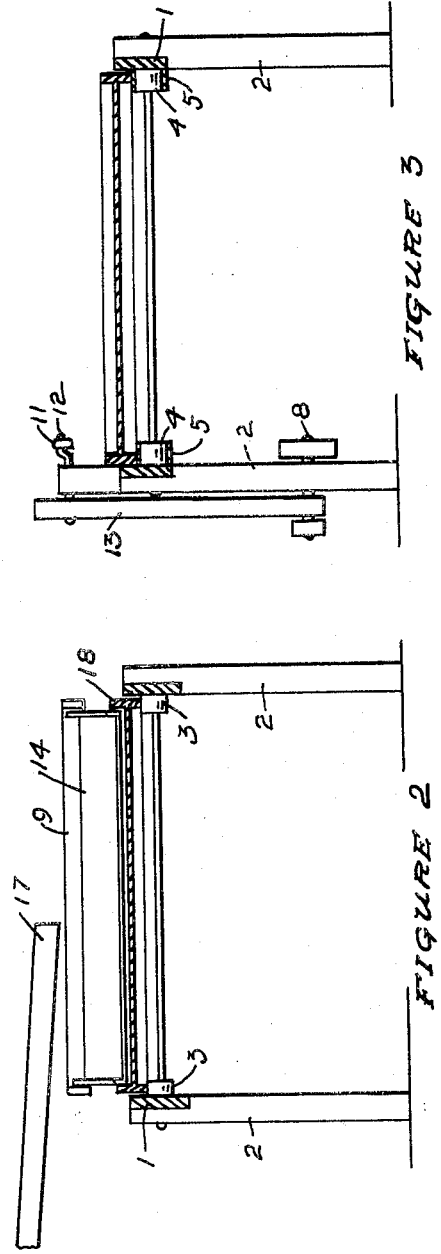
INVENTOR
William B. Simpson
John A. Naismith
ATTORNEY Patented Apr. 18, 1933

1,904,989

UNITED STATES PATENT OFFICE

WILLIAM B. SIMPSON, OF CAMPBELL, CALIFORNIA

SPREADER

Application filed September 26, 1931. Serial No. 565,387.

This invention relates particularly to means for spreading prunes, or other similar or spreadable material, upon trays.

It is one object of the invention to provide a mechanically operated mechanism that will receive a more or less continuous stream of material to be spread and distribute the same uniformly over a tray or other surface without intervening spaces or pockets.

It is another object of the invention to provide means for controlling the movement of the tray or other device upon which the material is being spread whereby to cooperate with the mechanism referred to, to secure positive and accurate spreading of the material, and to maintain successive trays in their proper relationship.

It is also an object of the invention to provide means of the above indicated character that will be economical to manufacture, simple in form and construction, strong, durable, and highly efficient in its practical application.

In the drawing:

Figure 1 is a side elevation of a machine embodying my invention, partly in section and parts broken away.

Figure 2 is a section on line 2—2 of Figure 1.

Figure 3 is a section on line 3—3 of Figure 1.

In the embodiment of the invention as herein disclosed, I show at 1 a horizontally disposed frame mounted upon legs 2.

In one portion of the frame 1 are mounted a number of rollers as 3 disposed in parallel relation to the plane of the frame and slightly below its upper edge, and transversely thereof. These rollers are idlers and permit a tray to be moved easily thereon lengthwise of the frame, and at its discharge end.

Preceding rollers 3 and at the receiving end of the frame are similarly mounted rollers 4, but these rollers carry belts as 5 upon which the trays are placed and by means of which the said trays are moved forwardly. The belts 5 are driven by belt and pulley connections 6 and 7 to a drive shaft 8 which is driven by a suitable power unit not shown.

At 9 is shown a platform enclosed on three sides but open at its forward end and supported on resilient brackets 10 mounted on frame 1. The platform is disposed immediately over the frame in substantially parallel relation thereto, a shaking movement being imparted thereto by a pitman 11 operated by crank 12 and belt and pulley connection 13 to shaft 8. A chute 14 is hinged to platform 9 at 15 and supported by an underlying bracket 16.

The result of this construction is that when material, such as prunes, is deposited upon the platform, as from a chute 17, it is spread out in a single layer and moved forwardly and down over the chute 14 by the shaking movement imparted to the platform where it is deposited upon the tray 18 therebelow. The lower forward edge of chute 14 is supported by bracket 16 a little above the bottom of the tray so that the shaking movement of the platform and chute 14 pushes the prunes forwardly into close contact.

A braking device is shown at 19 pivotally mounted on frame 1 at 20 and having a finger 21 adapted to be swung into contact with tray 18 to retard its forward movement when desired to enable the spreader platform and chute 14 to accurately distribute the prunes on the tray.

Assuming the structure to have been assembled and put into operation as above described, a tray 18 is placed upon the belts 5 which move it slowly forwardly upon rollers 3. As this tray moves forward a second tray is placed behind it, and the travelling belts move it forwardly and cause it to push the first tray slowly beneath chute 14. The fruit deposited upon tray 18 by the spreader mechanism is pushed up against the front end of the tray in the manner described, and as the tray advances additional fruit is deposited thereon and pushed up closely against the fruit already positioned thereon. If the fruit is flowing slowly the brake 19 is applied to slow down the movement of the tray until the space immediately in front of the spreader is filled, whereupon it is released and the tray allowed to advance at a normal rate of speed.

By means of this construction and mode of operation each tray is filled to its utmost capacity with great economy in time and labor. It is particularly advantageous when prunes are being placed upon the trays for drying in a dehydrator, because it enables the operator to handle a greater volume of fruit in a given space, and assures a more uniform drying of the fruit.

It will be understood, of course, that the movement of the spreader is not great and consequently it is important that some means be provided, such as the brake, for controlling the movement of the tray. Since there is only frictional contact between belts 5 and the tray thereon the belts will continue to rotate at their normal speed even though the brake is applied and the trays slowed down.

By hinging the chute 14 it will readily pass over the tray ends as they pass thereunder, and by pushing the forward tray through the medium of the rear tray their opposing ends are maintained in contact until the forward tray is filled and removed.

It is to be understood, of course, that while I have herein shown and described but one specific embodiment of my invention, changes in form, construction, and method of assembly and operation may be made within the scope of the appended claim.

I claim:

A machine for spreading fruit and similar material comprising, in combination, supporting means, a tray mounted thereon, means for moving the tray continuously thereover, a reciprocating spreader chute mounted for movement longitudinally of the tray and adapted to receive the material and having a discharge end communicating with the tray adjacent the bottom thereof to engage the material discharged on to the tray when a shaking movement is applied to the chute whereby to push the individual elements into close relationship.

WILLIAM B. SIMPSON.